Figure 3:
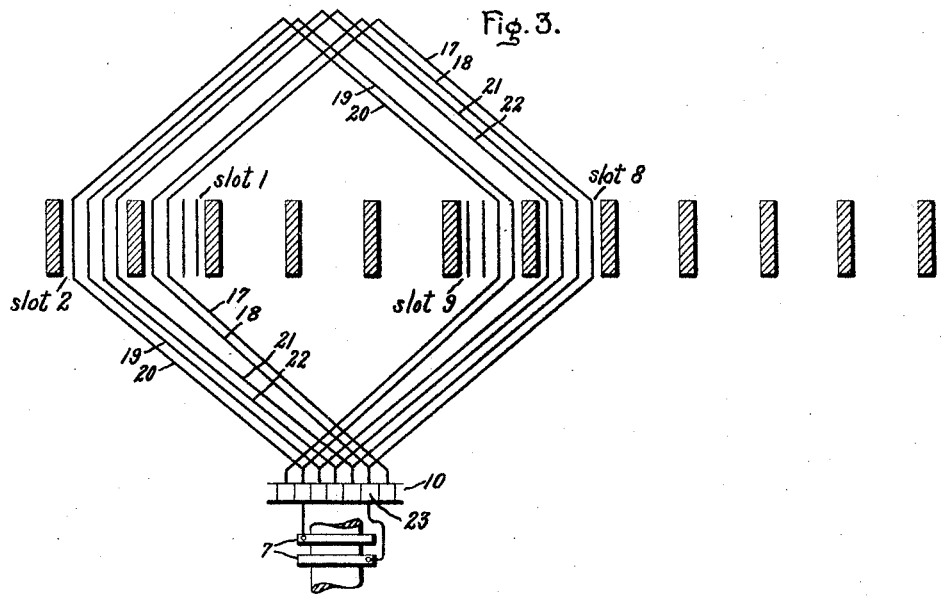

Sept. 22, 1925.                                                  1,554,711
S. CABOT
ELECTRIC CONVERSION
Filed Feb. 21, 1922            2 Sheets-Sheet 1
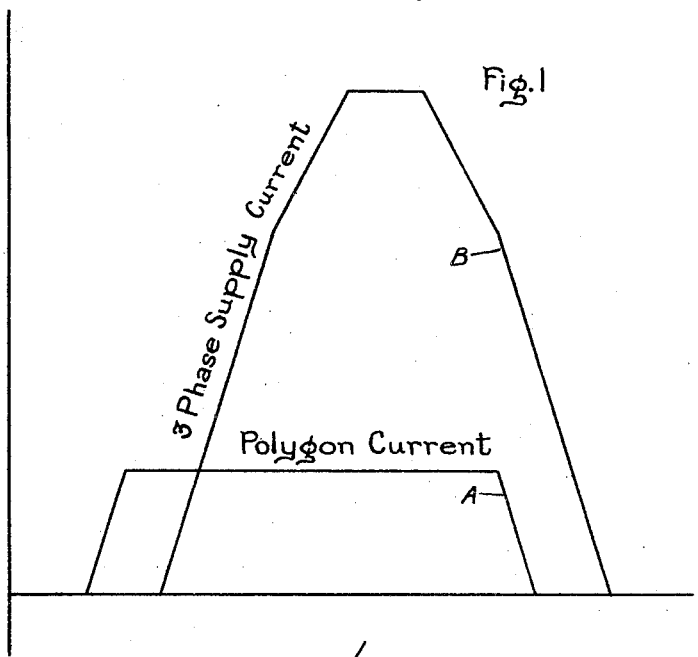
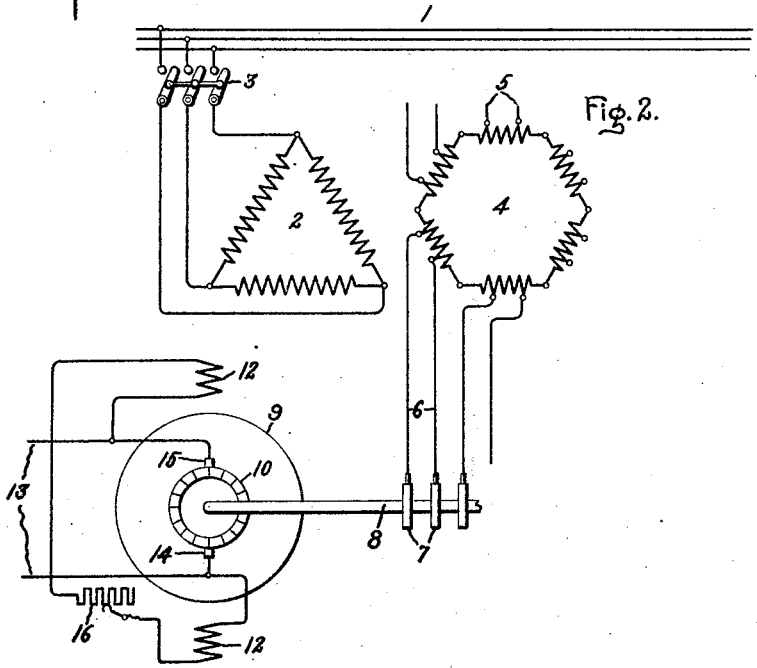
Inventor:
Sewall Cabot,
by Albert G. Davis
His Attorney.

Sept. 22, 1925.

S. CABOT

ELECTRIC CONVERSION

Filed Feb. 21, 1922

1,554,711

2 Sheets-Sheet 2

Inventor:
Sewall Cabot,
by
His Attorney

Patented Sept. 22, 1925.

1,554,711

UNITED STATES PATENT OFFICE.

SEWALL CABOT, OF BROOKLINE, MASSACHUSETTS, ASSIGNOR TO GENERAL ELECTRIC COMPANY, A CORPORATION OF NEW YORK.

ELECTRIC CONVERSION.

Application filed February 21, 1922. Serial No. 538,317.

*To all whom it may concern:*

Be it known that I, SEWALL CABOT, a citizen of the United States, residing at Brookline, in the county of Norfolk, State of Massachusetts, have invented certain new and useful Improvements in Electric Conversion, of which the following is a specification.

My invention relates to the conversion of polyphase current to direct current or vice versa and its principal object is to provide a system of polyphase rectification, using a commutator; wherein certain causes of sparking at the brushes are eliminated. A further object of my invention is to provide a mechanical rectifier capable of yielding a higher direct current voltage than has heretofore been possible with a given number of collector rings. A further object of my invention is to reduce the pulsations of the direct current voltage produced by such a rectifier. Other advantages of my improved rectifier will appear as the description proceeds.

Before describing my invention it will be helpful to mention briefly a simple system of rectification and some of its limitations as heretofore known to the electrical art. One such simple system is composed of a suitable polyphase transformer the secondary windings of which are connected in a closed circuit arranged to produce a polygon of electromotive forces symmetrically disposed both in magnitude and consecutive phase relation. Connections from the several apexes of the polygon being led through slip rings to commutator segments equal in number to or a whole multiple of the number of such phases. Resting upon this commutator are sets of brushes spaced apart by a number of segments equal to one-half the number of phases. When the commutator is rotated at a suitable synchronous speed, one set of brushes bearing upon it is charged with a substantially constant difference of potential from the remaining sets. By virtue of this difference in potential unidirectional current may be drawn from the brushes on the commutator being supplied from the transformer polygon which acts in a manner analogous to a direct current armature. This unidirectional current enters through the negative brushes, passes through the commutator segment or segments in contact therewith, through the corresponding slip ring or rings and the connections to the polygon. Here the unidirectional current of substantially constant electromotive force divides and flows through two parallel circuits in the polygon to points diametrically opposite, in an electrical sense, from whence it is carried through the slip rings connected to the segments making contact with the positive set of brushes. From this point the current flows through the load circuit back to the negatively charged brushes, thus completing the circuit. Such a simple rectifier is explained in my U. S. Patent No. 1,191,759 and in Steinmetz' Theory and Calculation of Electrical Apparatus, first edition, 1917, Fig. 116, p. 253. The load or energy current in each phase of the transformer secondary polygon is substantially constant, except during the period of time when each phase is short circuited by the brushes making contact with the commutator segments connected to the two ends of that phase. During this period of short circuit the current in the phase reverses. This action is commonly called "commutation". There is always a magnetic field associated with the current in the conductors in each phase which is not associated with the conductors in any other phase. During the reversal of the current in a phase this field which is supported by the current also reverses and thereby induces a voltage in the conductors of the phase which tends to maintain the current or prevent the reversal. This voltage is known as the "reactance voltage" of commutation. If this reversal of curerent takes place at a uniform rate commutation is said to be "linear". This condition is most desirable since it permits the brush to take current from the communtator at a uniform density at all points across the brush face. If linear commutation of a constant potential unidirectional current is assumed, the current in any single phase of the transformer polygon may be represented by a trapezoidal figure such as is shown in Fig. 1 of the drawing at A. The sides of the trapezoid represent current during linear commutation. The sum of the trapezoidal currents in all the windings on any particular magnetic circuit of the transformer will not produce a sinusoidal current in the primary winding on the same magnetic circuit. Moreover, in a transformer designed to be connected to a three-phase supply system the sum of any two primary currents when connected delta will not be a sinusoidal current in the supply line. The nature of this three-phase supply current is represented at B in Fig. 1. The departure of this current from the sinusoidal form constitutes the so-called "commutation ripple". This ripple encounters the reactance of the transformer, the supply lines and the supply generator, which reduces its magnitude and superimposes a portion of the ripple upon the direct current thereby preventing commutation or reversal of current in the polygon from being "linear" which causes sparking at the commutator brushes. The power which can be rectified by the simple rectifier is greatly limited by the sparking caused by the differential current, that is, the commutation ripple in the alternating supply current and the rectified unidirectional current. It is one of the objects of my invention to remedy this limitation.

In machines heretofore designed for furnishing large currents it was found impracticable to operate commutators at more than about 15 volts average difference of potential between adjacent commutator segments, otherwise, flash-overs at the commutator may result from load disturbances. This limit necessitates the use of an excessive number of collector rings in a simple rectifier designed to generate more than about 100 volts direct current. The mechanical and space considerations render it inadvisable to use more than 12 or 15 slip rings. This defect of the simple rectifier is overcome by my invention as will be explained later.

In the simple rectifier above explained, the alternating voltage generated in the polygon appears at the brushes on the commutator as a unidirectional pulsating voltage. The magnitude of these pulsations varies inversely with the number of phases in the secondary polygon. My invention overcomes this defect to a limited extent.

My improved system of conversion although equally applicable for transferring direct current to alternating current will be explained in connection with a system for converting alternating current into direct current. The system comprises a transformer connected as for the simple rectifier to generate a symmetrical alternating voltage from a closed polygon, and a rotating synchronous phase multiplier and compensator or armature provided with a set of collector rings, a commutator together with suitable brush gear, a stationary field structure, a base and suitable bearings. In outward appearance my improved machine resembles a rotary converter. The commutator and collector rings are preferably located on the same side of the armature. The armature of my machine is wound with coils having a plurality of pitches connected in groups to form a closed winding. Each coil is connected to two commutator segments. Certain groups of coils, symmetrically located in an electrical sense, are connected at the center of each group to collector rings and the collector rings are connected to equal voltage points on the secondary polygon of the transformer. This type of armature winding eliminates the first two mentioned defects of the simple rectifier and decreases the third mentioned defect.

Figure 4:
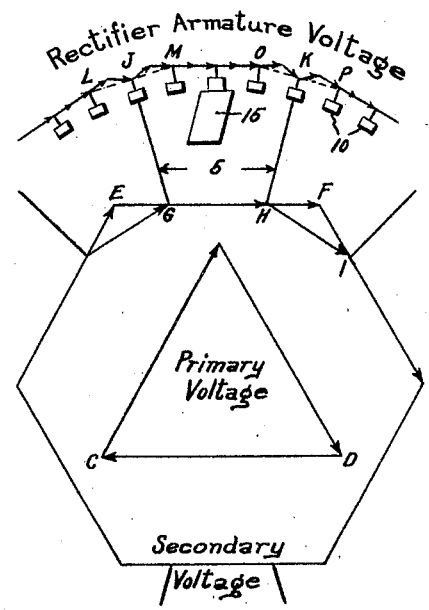

The features of my invention which I believe to be novel and patentable will be pointed out in the claims appended hereto. The design and method of operation of a machine built in accordance with my invention will be explained in connection with the accompanying drawings, in which Figure 1 shows the current waves already referred to; Fig. 2 diagrammatically illustrates the transformer and line connections of a 2-pole machine built in accordance with my invention; Fig. 3 diagrammatically illustrates one arrangement of armature coils for such a machine having six slots per pole, and Fig. 4 illustrates the vector voltage diagram of the transformer and machine shown in Figs. 2 and 3.

Referring now to Fig. 2, 1 indicates a polyphase supply line, and 2 the primary of a transformer connected thereto through a switch 3. Although not limited thereto, the transformer primary is illustrated as having three phases delta connected and is thus suitable for use with commercial circuits. The secondary 4 of the transformer is connected in a closed polygon having six coils. Taps 5 are provided at the proper distance from the end of each coil so that a balanced 12-phase system alternating current electromotive force may be obtained therefrom. The voltage diagram of the transformer is illustrated in Fig. 4 in which CD represents the voltage across one coil of the primary, EF the voltage across one coil of the corresponding secondary, GH the voltage between the two taps of a secondary coil and HI the voltage between adjacent taps on two adjacent secondary coils. The transformer is preferably wound with the primary and secondary sandwiched together in a manner to reduce the leakage reactance to a minimum for the purpose set forth in my U. S. Patent No. 1,191,759. This reduces the inductive effect and allows more liberality in interlinking the phases on the armature of my improved machine. This interlinking neutralizes or compensates for the leakage reactance of the transformer which it is not possible to entirely eliminate, however, I desire to have it understood that with the armature winding about to be explained, good results may be obtained using transformers with the leakage reactance usually present in commercial apparatus.

The twelve equal voltage taps of the transformer secondary are connected through leads 6 to twelve collector rings 7 on shaft 8 of my improved rectifier. For the sake of simplicity only a portion of the lead 6 and slip ring 7 have been illustrated. The slip rings are connected to the armature windings in a manner to be explained in connection with Fig. 3. In Fig. 2 the armature of the rectifier is designated at 9, the commutator at 10 and the field windings at 12. The direct current load circuit 13 is connected to the commutator through brushes 14 and 15 in the usual manner and the field windings may be supplied from this rectifier circuit through the usual field rheostat 16 as illustrated. By this arrangement, the machine acts independently as a synchronous motor to rotate the collector rings, commutator and armature at the proper synchronous speed and thereby replaces the separate synchronous motor necessary with the simple rectifier.

Referring now to Fig. 3, the armature core is composed of circular iron sheets containing slots arranged in the customary manner. The twelve slots of the armature have been illustrated as laid out flat. In the present illustration, these slots contain full pitch and fractional pitch windings connected in alternate groups to form a closed multiple lap winding. For the sake of simplicity only a portion of the windings have been illustrated from which the arrangement of the complete windings will readily be apparent to those skilled in the art. Coils 17, 18, 19 and 20 are pitched five slots. Coils 21 and 22 are pitched six slots. Thus in the twelve slot 2-pole machine coils 17, 18, 19 and 20 are fractional pitch coils and 21 and 22 are full pitch coils. The conductors shown in slot 8 will occupy the bottom of the slot and those shown in slot 2 will occupy the top of the slot or vice versa and other coils not shown will occupy the remaining space in these slots as is usual in multiple lap windings. A collector ring is connected to the center of each fractional pitch group as shown at the point where the conductors 17 and 18 connect together to the commutator segment 23. It will be understood that the coils may contain any desired number of turns and that the slots may contain any desired number of coils. In a 2-pole machine there will be at least one collector ring for each active armature slot. Each coil is connected to two commutator segments and the number of segments will therefore vary with the number of coils. It is thus evident that the ratio of commutator segments to collector rings is not necessarily unity as in the simple rectifier but may be made as high as desirable thereby allowing the production of a high direct current voltage across the brushes without exceeding the workable voltage between adjacent commutator segments and without the use of an excessive number of collector rings.

The armature winding just described has the property of permitting the load current to flow non-inductively from two collector taps through the conductors in the slots to the brush on the commutator between the two taps. That is to say the energy current splits up between the leads in such a way that the magnetomotive force in the slots containing coils undergoing commutation reduces to zero. This current enters the brush face at a uniform density, or with the effect of "linear" commutation. The armature winding has the property by virtue of the overlapping or inter-linking of adjacent phases, of transferring the commutation ripples in various degrees through all the phases of the windings to the corresponding phases of the transformer secondary polygon with the final result that the corresponding currents drawn from each three-phase primary supply line combine into a true sinusoidal form which is necessary for a constant uniform flow of energy. By this means the differential current present in the simple rectifier is entirely eliminated and sparkless commutation results without the necessity of brush shifting.

The armature winding between any two adjacent alternating current taps comprises coils of at least two different pitches and the alternating current voltage generated in these coils is displaced in time phase. This results in multiplying by 2 or more the number of phases of voltage supplied by the transformer through the collector rings and thus the pulsating character of the voltage present in the simple rectifier is reduced accordingly. Although I have described an armature having two different pitches, I do not wish to be limited thereto as it will be evident that other combinations may be worked out in which three or more different pitched windings are used for accomplishing the same result. The manner in which this phase-multiplying effect is accomplished will be clear from an inspection of the rectified voltage vector diagram shown in Fig. 4. JK represents the actual rectified voltage between two adjacent collector ring taps. The small arrows on this line represent the voltage generated in the coils of the armature. If the coils were all wound with the same pitch, this line would be straight and parallel to the line GH which represents the voltage in the corresponding phase of the secondary transformer polygon. However, due to the interlinking produced by the use of coils of different pitches the voltages generated in the two slots adjacent each collector ring tap is displaced in time phase as represented and the resultant direct current voltage is substantially the same as would be produced by a transformer polygon of double the number of phases when used with the simple rectifier. Such a polygon may be represented by connecting points L and M, O and P etc. as indicated by the dotted line in Fig. 4. It will be noticed that the actual voltage obtained varies only slightly from such a polygon.

My invention has been described in connection with a 2-pole machine supplied from a 12-phase source in which twelve collector rings and twelve slots have been specified. However, I do not wish to be limited to this particular arrangement as it will be evident to those skilled in the art that I might, for example, build a machine having four poles, twenty-four slots and twelve collector rings supplied from a 12-phase source. In this case each collector ring would have two connections to the armature winding at points diametrically opposite. I might build a machine having four poles, thirty slots and fifteen collector rings supplied from a 15-phase source. Furthermore, I do not wish to be limited to a two-pitch multiple lap armature winding. Other types of armature windings may be used so long as the following conditions which I believe to be essential to my invention are observed; First, that the number of points at which alternating current is supplied to the armature shall be at least equal to the number of active slots in the armature; and Second, that armature coils of more than one pitch be placed in all the active armature slots and connected into a single closed winding. In some cases it may be desirable to make the armature winding as the stationary member and rotate the brushes. This however will not affect the principles involved in my invention as above described.

What I claim as new and desire to secure by Letters Patent of the United States, is:—

1. Converting apparatus comprising relatively rotatable field and armature members, said armature member being provided with slots containing a closed winding composed of coils of more than one pitch connected to a commutator and provided with alternating current taps equal in number to the number of slots.

2. Synchronous converting apparatus comprising relatively rotatable field and armature members, slots in said armature, a closed winding on said armature comprising interlinked coils of more than one pitch in each of said slots, a commutator connected to said winding, and symmetrically arranged alternating current taps for said winding equal in number to the number of said slots.

3. A polyphase synchronous rectifier comprising relatively rotatable field and armature members, said armature having one half the number of slots per pole as the number of supply phases, full pitch and fractional pitch coils contained in said slots and connected in alternate groups to form a closed winding, a commutator connected to said winding and an alternating current tap at the center of each group of fractional pitch coils.

4. In combination an alternating current supply line, a transformer having its primary winding connected thereto and its secondary connected in a closed polygon, a synchronous phase multiplier and converter having a slotted armature provided with a closed winding composed of interlinked coils of more than one pitch symmetrically connected to equal voltage taps on said secondary polygon, the number of said taps being equal to the number of slots per pair of poles, means for commutating said armature winding and a direct current supply line connected to said commutating means.

5. Converting apparatus comprising an armature provided with a commutator and brushes, means for synchronously rotating said armature with respect to said brushes, said armature being provided with slots containing a closed winding composed of coils of more than one pitch connected to said commutator and provided with alternating current taps equal in number to the number of said slots, the number of segments in said commutator being greater than the number of said taps.

In witness whereof, I have hereunto set my hand this seventeenth day of February, 1922.

SEWALL CABOT.